US008806015B2

(12) United States Patent
Dutta et al.

(10) Patent No.: US 8,806,015 B2
(45) Date of Patent: *Aug. 12, 2014

(54) WORKLOAD-AWARE PLACEMENT IN PRIVATE HETEROGENEOUS CLOUDS

(75) Inventors: Sourav Dutta, West Bengal (IN); Akshat Verma, Vasant Enclave (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/100,779

(22) Filed: May 4, 2011

(65) Prior Publication Data
US 2012/0284408 A1 Nov. 8, 2012

(51) Int. Cl.
*G06F 15/173* (2006.01)
*G06F 15/177* (2006.01)
*H04L 29/08* (2006.01)
*H04L 12/56* (2006.01)

(52) U.S. Cl.
CPC ......... *H04L 29/08144* (2013.01); *H04L 47/826* (2013.01); *H04L 47/20* (2013.01); *H04L 47/822* (2013.01); *H04L 47/823* (2013.01)
USPC ............ 709/226; 709/224; 709/221; 709/222

(58) Field of Classification Search
CPC ... H04L 29/08144; H04L 20/06; H04L 47/20; H04L 47/822; H04L 47/823; H04L 47/826
USPC .......... 709/217, 219, 220–222, 224, 226, 223
See application file for complete search history.

(56) References Cited

U.S. PATENT DOCUMENTS

| 2004/0267897 A1* | 12/2004 | Hill et al. ...................... 709/217 |
| 2006/0230407 A1* | 10/2006 | Rosu et al. ................... 718/105 |
| 2010/0050172 A1* | 2/2010 | Ferris ................................ 718/1 |
| 2010/0268764 A1 | 10/2010 | Wee et al. |
| 2010/0318630 A1 | 12/2010 | Howell et al. |
| 2012/0089726 A1* | 4/2012 | Doddavula .................... 709/224 |

FOREIGN PATENT DOCUMENTS

| EP | 1257910 | 11/2002 |
| WO | 02089014 | 11/2002 |
| WO | 2004012038 | 2/2004 |

OTHER PUBLICATIONS

Server Consolidation and Improved Resource Utilization, URL: http://searchservervirtualization.techtarget.com/resources/Server-consolidation-and-improved-resource-utilization?bucketCode=REF, Apr. 25, 2011, Abstract.
Kang-Won Lee, Bong-Jun Ko and Seraphin Calo, "Adaptive Server Selection for Large Scale Interactive Online Games", Source: Computer Networks vol. 49, Issue 1, Sep. 15, 2005, pp. 84-102.

(Continued)

*Primary Examiner* — Brian J Gillis
*Assistant Examiner* — Shean Tokuta
(74) *Attorney, Agent, or Firm* — Gibb & Riley, LLC

(57) ABSTRACT

Systems determine workload resource usage patterns of a computerized workload, using a computerized device. Such systems use the computerized device to place the computerized workload with a computer server cluster within a private cloud computing environment. Also, systems herein place the computerized workload on a selected computer server within the computer server cluster that has a resource usage pattern complementary to the workload resource usage profile, also using the computerized device. The complementary resource usage pattern peaks at different times from the workload resource usage patterns.

15 Claims, 12 Drawing Sheets

(56) References Cited

OTHER PUBLICATIONS

A. I. Avetisyan et al., "Open Cirrus: A Global Cloud Computing Testbed", In IEEE Computer, 2010, pp. 1-9.

Amazon Elastic Compute Cloud (Amazon EC2), http://aws.amazon.com/ec2/, Apr. 25, 2011, Abstract.

N. Bobroff, A. Kochut, and K. Beaty, "Dynamic Placement of Virtual Machines for Managing Sla Violations", In IEEE Conf. Integrated Network Management, 2007, pp. 119-128.

M. Korupolu, A. Singh, and B. Bamba, "Coupled Placement in Modern Data Centers", In IEEE IPDPS, 2009, pp. 1-12.

A. Verma, G. Dasgupta, T. Nayak, P. De, and R. Kothari, "Server Workload Analysis for Power Minimization Using Consolidation", In Proc. Usenix ATC, 2009, pp. 1-14.

Office Action Communication, U.S. Appl. No. 13/596,298, Dated Apr. 12, 2013, pp. 1-25.

Notce of Allowance Communication, U.S. Appl. No. 13/596,298, Dated Jan. 27, 2014, pp. 1-12.

\* cited by examiner

WORKLOAD-AWARE PLACEMENT IN PRIVATE HETEROGENEOUS CLOUDS

BACKGROUND

The embodiments herein relate to methods and systems that process cloud computing applications, and more specifically, to methods and systems that place the computerized workload on a selected computer server within the computer server cluster that has a resource usage pattern complementary to the workload resource usage profile.

Cloud computing has emerged as an exciting hosting paradigm to drive up server utilization and reduce data center operational costs. Even though clouds present a single unified homogeneous resource pool view to end users, the underlying server landscape may differ in terms of functionalities and reconfiguration capabilities (e.g., shared processors, live migration). Further, clouds hide the fact that existing applications may already be placed on the servers.

SUMMARY

Some exemplary methods herein determine workload resource usage patterns of a computerized workload, using a computerized device. Such methods herein use the computerized device to place the computerized workload with a computer server cluster within a private cloud computing environment. Also, methods herein place the computerized workload on a selected computer server within the computer server cluster that has a resource usage pattern complementary to the workload resource usage profile, also using the computerized device. The complementary resource usage pattern peaks at different times from the workload resource usage patterns.

Various other exemplary methods herein determine workload resource usage patterns, variability requirements, and reconfiguration requirements of a computerized workload, using a computerized device. Such methods herein place the computerized workload with a computer server cluster (within a private cloud computing environment) that matches the variability requirements and the reconfiguration requirements of the computerized workload, again using the computerized device. Also, methods herein place the computerized workload on a selected computer server within the computer server cluster that has a resource usage pattern complementary to the workload resource usage profile, also using the computerized device.

The complementary resource usage pattern peaks at different times from the workload resource usage patterns. When the complementary resource usage pattern peaks at different times from the workload resource usage patterns, resources of the selected computer server are utilized at different times from other workloads running on the selected computer server. Additionally, methods herein distribute individual applications of software applications suites across different servers of the computer server cluster because such software applications have workloads that are non-complementary and peak at the same times. Alternately, the complementary resource usage pattern differs from the workload resource usage pattern in the resource (e.g., CPU, Memory, Network, Disk) that is contented for. When different resources are utilized at the same time as the workload resource usage pattern, the different resources of the selected computer server are utilized at the same time by all workloads running on the same selected computer server.

The private cloud computing environment comprises clusters of computer servers that have the ability to receive online placement of workloads and have heterogeneous reconfiguration capabilities. Also, within the private cloud computing environment, clusters of computer servers are controlled by at least one manager and are used by at least one user. The manager maintains resource usage patterns of workloads running on the clusters of computer servers and shares the resource usage patterns of such workloads with the users. Additionally, the users maintain resource usage patterns of the applications that are proposed to be uploaded to the clusters of computer servers and shares such resource usage patterns with the manager.

Various system embodiments herein comprise a computerized device that determines workload resource usage patterns, variability requirements, and reconfiguration requirements of a computerized workload. A global placement manager is operatively connected to (directly or indirectly connected to) the computerized device. The global placement manager matches the computerized workload to a computer server cluster within a private cloud computing environment that corresponds to the variability requirements and the reconfiguration requirements of the computerized workload. Also, a local placement manager is operatively connected to the computerized device. The local placement manager places the computerized workload on a selected computer server within the computer server cluster that has a complementary resource usage pattern to the workload resource usage profile, using the computerized device. Again, the complementary resource usage pattern peaks at different times from the workload resource usage patterns.

BRIEF DESCRIPTION OF THE SEVERAL VIEWS OF THE DRAWINGS

The embodiments herein will be better understood from the following detailed description with reference to the drawings, which are not necessarily drawing to scale and in which.

DETAILED DESCRIPTION

Figure 1:
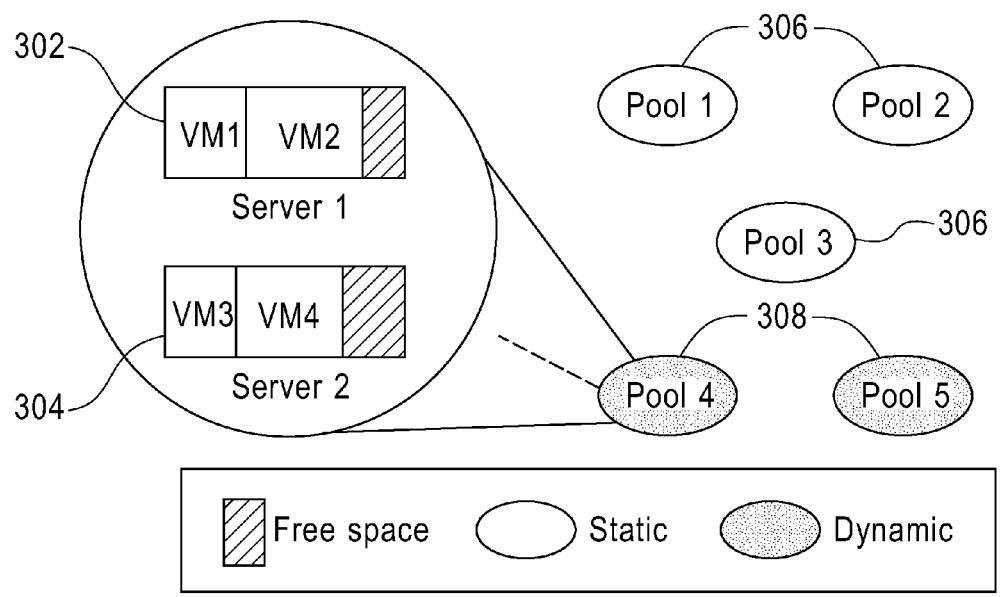
FIG. 1 is a schematic diagram illustrating resource pools in a private cloud according to embodiments herein.
Figure 2:
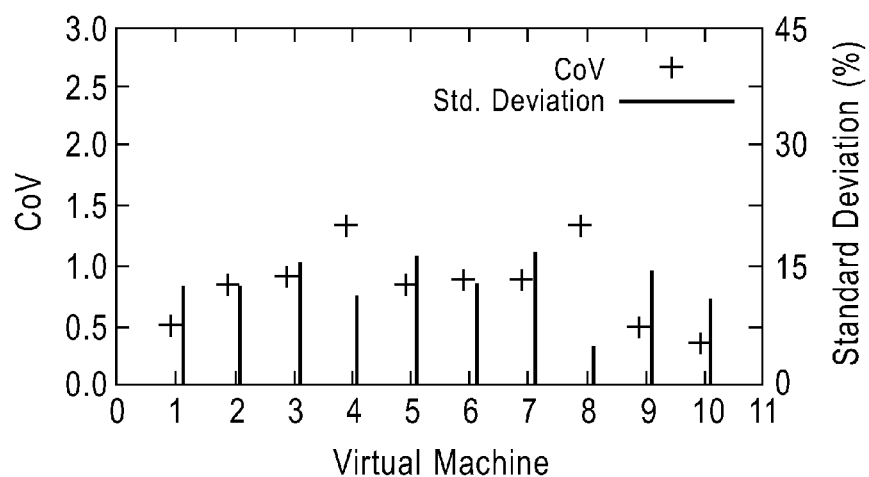
FIG. 2 is a chart showing coefficient of variation and standard deviation for a cluster according to embodiments herein.

As mentioned above, even though clouds present a single unified homogeneous resource pool view to end users, the underlying server landscape may differ in terms of functionalities and reconfiguration capabilities (e.g., shared processors, live migration) and clouds hide the fact that existing applications may already be placed on the servers. In a private cloud setting where information on the resources as well as workloads are available, the placement of applications on clouds can leverage it to achieve better consolidation with performance guarantees. This disclosure presents the design and implementation of a provisioning system for private clouds. Current cloud environments may only do round-robin placement, which leads to lower resource utilization. The techniques described below dramatically improve resource utilization.

Given an application's resource usage patterns, the embodiments herein match it with a server cluster with the appropriate level of reconfiguration capability. Further, the embodiments herein also place the application on a server that has existing workloads with complementary resource usage profile. These methods can be implemented using a hybrid architecture with a global server cluster selection module and local cluster-specific server selection modules. Using production traces from live data centers, this disclosure demonstrates the effectiveness of these methods over existing placement methodologies.

I. Introduction

Cloud computing has emerged as one of the most distributed technologies, significantly improving data center efficiency and reducing operational costs. Clouds bring a service flavor to infrastructure, platform, and software and enable on demand resource fulfillment to an enterprise customer. Two differentiators of a cloud are the ability to provision new virtual machines or applications in a matter of minutes, and significantly increase the utilization of data center resources.

Public clouds (e.g., the Amazon Elastic Compute Cloud EC2 (http://aws.amazon.com/ec2/) hereinafter "Amazon EC2") were the first clouds to emerge on the technology landscape. A cloud like Amazon EC2 provides an interface in which a customer can request virtual machine instances of a fixed size. Amazon EC2 hides the complexity of the data center landscape from the end user and allocates resources to the virtual machine without sharing any details with the user. This disclosure terms such a cloud model as a Closed Cloud model, where the end user does not have any visibility inside the cloud. A Closed Cloud model is not very useful for applications that have specific network, storage, or clustering requirements. The Open Cirrus (A. I. Avetisyan et al., Open Cirrus: A Global Cloud Computing Testbed, In *IEEE Computer*, 2010) cloud platform addresses this issue and allows end users to make more informed choices on the physical servers and data center networking employed for the hosted applications. However, the cloud provider is not aware of the workloads running on the leased server instances and their application performance. This disclosure terms such a cloud model as a One Way-Open Cloud model. A third model for cloud computing has emerged quickly in large shared data centers that host multiple large customers or even in data centers of large enterprises. A cloud running inside a data center catering to private customers is often called a private cloud. A private cloud also inherits the salient advantages of cloud computing, namely on demand provisioning and high resource utilization. However, in a private cloud, the end customer has complete visibility on the deployment of its workloads and the cloud provider has visibility on the performance of the applications in the cloud. This disclosure terms such a cloud model with 2-way visibility as an Open Cloud model.

The placement of applications in a typical public cloud environment is fairly straightforward due to the closed nature of the cloud. Hence, the cloud provider has no information on the nature of application and its workload profile. On the other hand, an Open Cloud model provides rich information on the application characteristics as well as the data center resources. This information can be leveraged to drive much higher resource efficiency and guarantee application performance in the shared cloud environment.

Placement of applications on a shared private cloud following an Open Cloud model poses significant research challenges. Even though clouds expose a homogeneous view of the underlying resources, typical data centers consists of hardware procured over the years with varying capabilities and performance profiles. FIG. 1 illustrates a typical data center layout that includes various static computer server pools 306 and various dynamic computer server pools 308 (the servers 302, 304 of which are expanded in the drawing). A data center can include multiple resource pools, where all the servers in a resource pool are in the same subnet and have similar properties. Servers in some resource pools may allow dynamic resource reconfiguration. These pools are labeled as 'Dynamic' pools 308. Resource pools containing legacy servers that do not support dynamic reconfiguration are labeled as 'Static' pools 306. Each server in either pool may host one or more virtual machine images. The spare capacity on each server may be used to host new applications.

Placement in a private cloud poses some fundamental challenges. A cloud is elastic by nature, and moves resources in response to workload variations. However, the elasticity in various resource pools in the cloud varies significantly. Similarly, the workloads on the cloud may have very different resource usage profiles. A fundamental problem that a placement strategy needs to solve is to match the workload requirements to the server pool capability. For example, a steady workload may be a good fit for a server pool that does not allow live migration or resizing. On the other hand, a highly variable workload needs to be either sized for peak workload intensity (leading to low resource utilization) or it should be placed on a server pool with dynamic reconfiguration capabilities. A second challenge for the placement problem is the inherent online nature of the placement problem. Static consolidation has been an active area of research, which handles the problem of consolidating workloads running on standalone servers to a virtualized environment (N. Bobroff, A. Kochut, and K. Beaty. Dynamic Placement Of Virtual Machines For Managing SLA Violations, In *IEEE Conf. Integrated Network Management,* 2007, hereinafter referred to as "Bobroff 2007"; M. Korupolu, A. Singh, and B. Bamba, Coupled Placement In Modern Data Centers, In *IEEE IPDPS,* 2009; and A. Verma, G. Dasgupta, T. Nayak, P. De, and R. Kothari, Server Workload Analysis For Power Minimization Using Consolidation, In *Proc. Usenix ATC,* 2009, hereinafter referred to as "Verma 2009"). In this scenario, this disclosure performs a bulk placement of all the workloads together. On the other hand, onboarding of captive applications to a private cloud is an online activity, as applications are onboarded one after another. This online nature of placement prevents offline static consolidation techniques from being applicable in a cloud environment. Finally, even though a cloud provides dynamic reconfiguration capabilities, there are costs associated with reconfiguration. Hence, a placement scheme needs to minimize the amount of dynamic reconfiguration that may be required on the cloud during steady operation.

This disclosure investigates the placement of applications running in a captive data center environment to a shared private cloud infrastructure. This disclosure identifies online placement and heterogeneous reconfiguration capability as the key differences between data center consolidation and placement in private clouds. Using an analysis of production workloads, this disclosure characterizes the importance of incorporating the resource profile of existing workloads, while placing new applications in a private cloud. Drawing from the insights, these methods design the cloud provisioning framework and method. These methods are based on a hybrid architecture with a global and a local placement manager. The global placement manager identifies an appropriate pool based on workload variability and reconfiguration capabilities of the server pool. The local placement manager identifies the target server in the pool based on the resource profile of the new workload and existing workloads placed in the pool.

II. Placement in Private Cloud

Virtual machine placement in data centers has been an active research area in the past (see, Bobroff 2007, Verma, 2009). However, the emergence of clouds poses additional complexity to the placement problem. In this section, this disclosure details the key differences in a cloud setting and presents insights that help solve the problem.

A. Placement: What is New in Private Clouds?

A cloud environment usually onboards applications in an online fashion. Hence, a cloud placement method needs to be aware of the existing placement of applications in the cloud. Further, an enterprise is typically aware of the new applications that may be onboarded to the cloud in the near future. Hence, the placement method should be aware of existing placement as well as expected workloads likely to be placed on the cloud in future.

Heterogeneous server pools and zones are clouds that provide the abstraction of a homogeneous information technology (IT) environment to an end user. However, enterprise applications may need to be separated for business, security or compliance reasons. Hence, even in a cloud environment, servers may be clustered into server pools with firewall restrictions between the server pools. Further, enterprise clouds are scavenged from existing servers in the data center. The data center may contain a mix of old and new servers that differ in terms of processing capacity, memory and I/O bandwidth. Hence, servers in a cloud are heterogeneous in terms of zones and capabilities.

Reconfiguration ability is due to heterogeneity between servers, and a server pool may have varying cloud reconfiguration capabilities. A server pool with older servers may only have dedicated resource assignments, which cannot be changed without rebooting the virtual machine. A server pool without enterprise hypervisor licenses may have shared resource assignments and live virtual machine (VM) resizing but may not have live migration. A state-of-the-art server pool may have live VM resizing as well as live migration. Hence, a cloud placement method needs to deal with heterogeneous dynamic resource allocation capabilities.

B. Goals of Cloud Placement

The goal of traditional virtual machine placement is to find a placement that minimizes some metric of the placement (e.g., total power consumed by servers, total cost of servers, total capacity of servers used). Since clouds have online application onboarding and have reconfiguration capabilities, this disclosure now enumerate the goals of a cloud placement method.

The embodiments herein minimize total capacity of servers used. The primary goal of any placement scheme is to minimize the cost of the servers used for placing the applications. Cloud placement also shares the same goal. The embodiments herein improve resource utilization. The clouds promise high utilization of the hardware resources. Hence, a cloud placement solution should aim to improve resource utilization even for servers without reconfiguration capabilities. The methods herein minimize performance impact due to consolidation (PI). The cloud placement has the additional goal that there should be a minimal performance impact due to consolidation. This is especially true for server pools that do not have dynamic reconfiguration capabilities. Further, clouds allow reconfiguration to deal with workload variations. However, every reconfiguration action in a cloud has associated costs, which vary based on the capabilities of the server pool. Hence, cloud placement should have the goal to minimize the reconfiguration cost incurred due to the selected placement.

C. Understanding Cloud Placement

A trace study helps understand the implications of the aspects of cloud placement. For a trace study, this disclosure simulated a cloud placement scenario with four application suites running in the production data center of a Fortune 500 enterprise. Each application suite consisted of a set of virtual machines that hosted one component of the large enterprise application. The traces contained the resource utilization for each virtual machine over a period of two months. Each entry in the trace file captured 5-minute averages for the CPU, memory, network and disk I/O used by the virtual machine. More details about the workload are available in an earlier work (Verma 2009).

The first goal was to understand the variability of a workload. Since server pools in a cloud have varying degrees of dynamic resource configuration capabilities, it was investigated if cloud workloads also have varying degree of variability. FIGS. 2-5 capture the Standard Deviation and Coefficient of Variation (CoV=Standard Deviation/Mean) for the virtual machines in each of the four application suites. Standard Deviation captures the absolute variation in workload whereas CoV captures the relative variation in the workload from its average intensity. As shown in FIGS. 2-5, the CoV of the workloads vary from 0.06 to 3 or more and the standard deviation also varies from 2% to 35%. This leads to the first observation.

Figure 3:
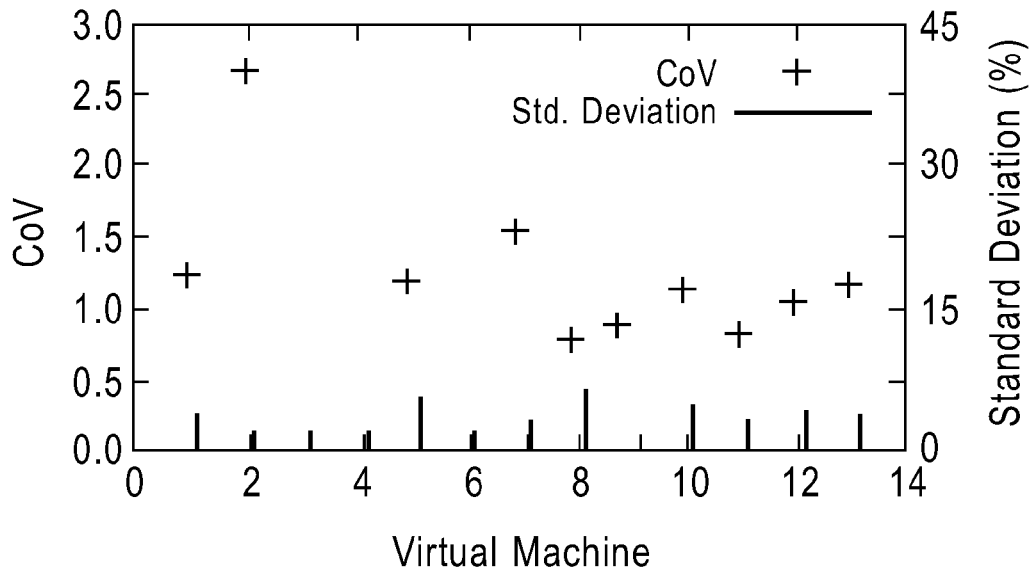
FIG. 3 is a chart showing coefficient of variation and standard deviation for a cluster according to embodiments herein.
Figure 4:
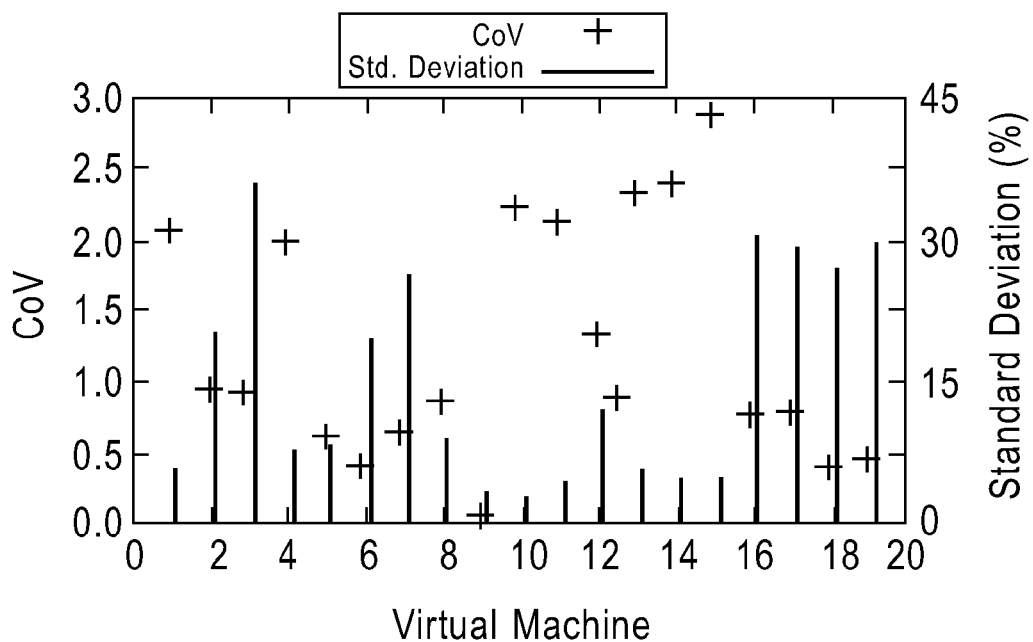
FIG. 4 is a chart showing coefficient of variation and standard deviation for a cluster according to embodiments herein.
Figure 5:
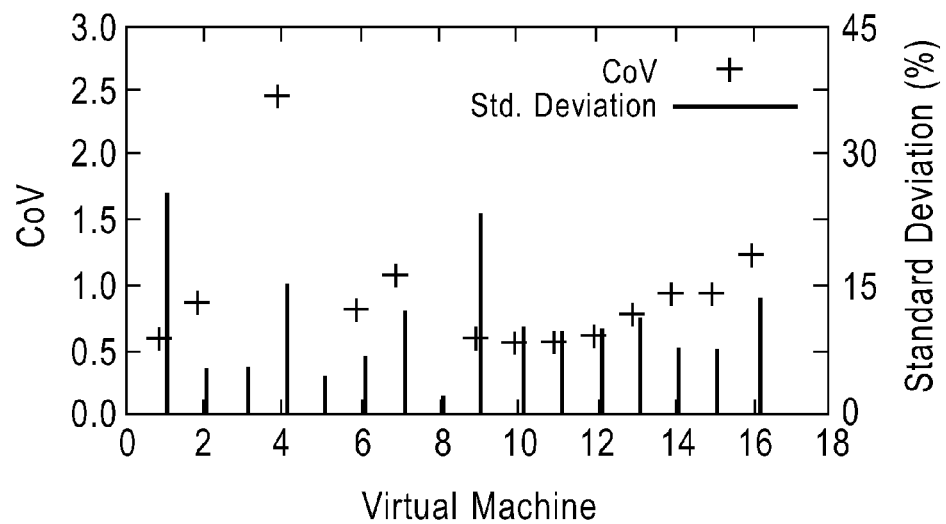
FIG. 5 is a chart showing coefficient of variation and standard deviation for a cluster according to embodiments herein.

In the first observation, there are both low covariance and high covariance applications. The first observation implies that one should match workloads to server pools based on the variability of the workload and the dynamic reconfiguration capabilities of the server pool. Next, it was investigated if the zoning restrictions between applications may prevent one from following such an approach. It was observed that there is a strong correlation between variability of an application and the variability of its components. It was also observed that AppCluster3 has a large number of virtual machines with high variability (FIG. 4). On the other hand, AppCluster2 has low aggregate variability and most of its virtual machines also have very small standard deviation (FIG. 3). Similarly, most virtual machines in AppCluster1 and AppCluster4 have similar degree of variability. This leads to the next observation.

In the second observation, components of an application typically have similar workload variance. The second observation implies that matching applications to pools may work well in practice. This is because applications with high aggregate variability have large number of variable components whereas applications with small aggregate variability have mainly components with low variability. The next goal was to understand the impact of the online aspect of cloud placement. Placement techniques try to place complementary workloads (workloads that do not peak at the same time are defined as complementary) together to reduce the total server capacity used (C). Since an application is placed on a cloud with existing applications, it is important to understand if the placement also needs to take into account the correlation between existing workloads and the new application.

Figure 6:
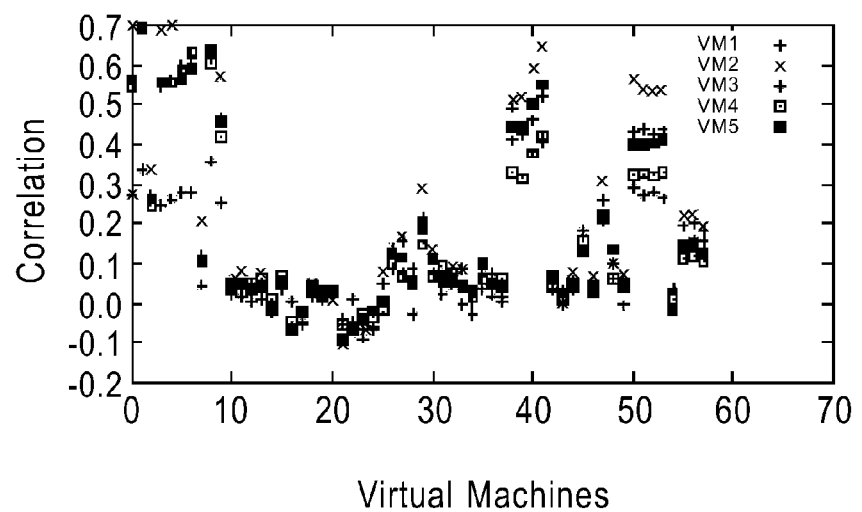
FIG. 6 is a chart showing coefficient of variation and standard deviation for a cluster according to embodiments herein.
Figure 7:
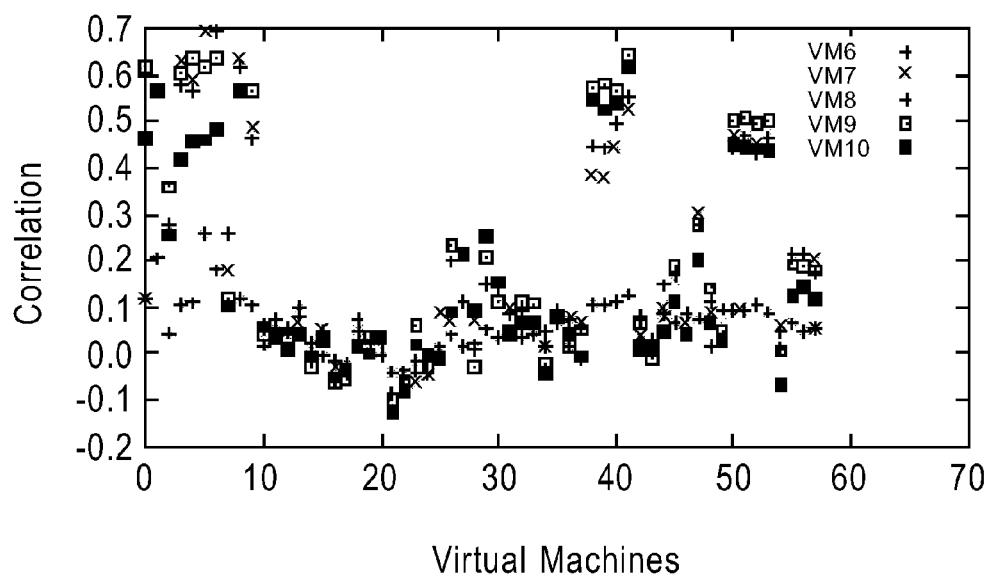
FIG. 7 is a chart showing intra-cluster and inter-cluster correlation for a cluster according to embodiments herein.

Methods herein compute the correlation between one application component and other components of the application as well the components of other applications in FIG. 6 and FIG. 7. The first 10 points in the figure show the correlation of a VM from AppCluster1 with other VMs in AppCluster1. The remaining points show the correlation between the VM and VMs in other clusters. This observes that the correlation between VMs in same cluster is higher than correlation between VMs in different clusters. However, even though a VM is more likely to be correlated with a VM in the same application suite, there are many instances of high correlation with a VM of a different application suite (e.g., VM2 with VM 40 in FIG. 6). This leads to the following observations.

In a third observation, all components of an application are positively correlated with each other. In a fourth observation, there may be correlation between VMs across different application suites. The above observations have very important implications for a placement strategy. A placement strategy cannot be oblivious of the placement of existing applications in the cloud. If a new VM is placed with existing complementary workloads, it may lead to lower resource consumption. Hence, a placement strategy needs to be aware of the existing VM placement on the cloud. A second important implication of the observations is that VMs from one application suite are usually positively correlated and hence should be distributed across a candidate server pool. Hence, this disclosure does not really need to find complementary patterns between the components of an application. This observation helps to design an efficient placement strategy that can place each component of the application independently.

III. Architecture and Flow

A. Architecture

Figure 8:
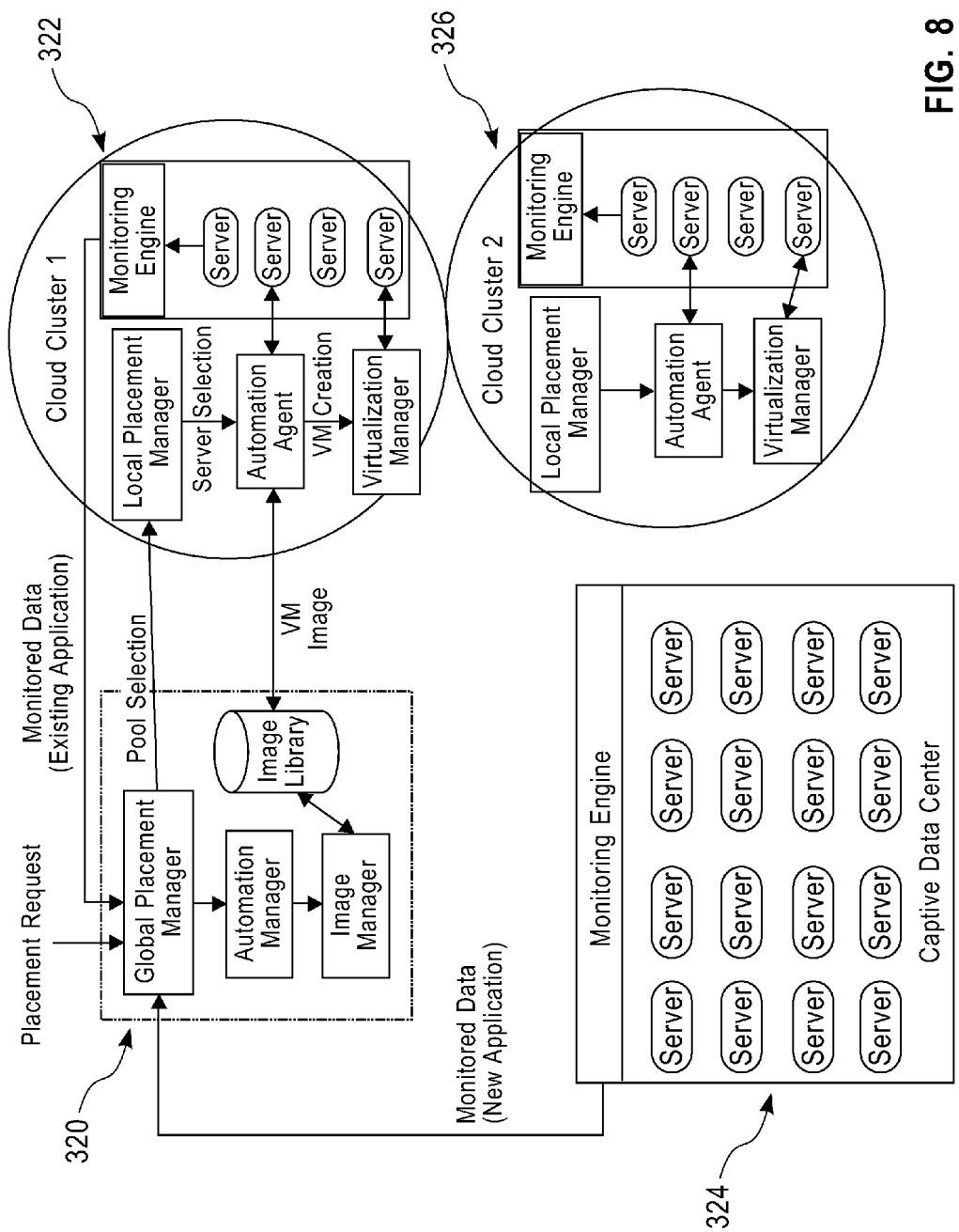
FIG. 8 is a schematic diagram illustrating a placement architecture according to embodiments herein.

This disclosure presents one example of a placement architecture in FIG. 8. A private cloud consists of heterogeneous server clusters (322, 326) with varying capabilities and the placement problem needs to map a workload to (i) an appropriate server cluster in the cloud and (ii) a target server in the selected cluster. One of the design choices in a cloud placement framework is to select between a centralized placement manager and a distributed placement manager. One example is hybrid design, where the server pool selection logic is implemented by a Global Placement Manager and the target server selection logic is implemented by Local Placement Managers for each cluster (shown in item 320). The hybrid placement framework allows the methods and systems herein to be applicable in large federated clouds, where precise information of the servers in each cluster may be difficult to obtain.

This disclosure also supports the Open Cloud model, where the placement logic has information on available resources as well as workload performance. Hence, the embodiments herein have a monitoring framework for each cluster 322, 326 in the cloud as well as the captive data center 324. The Global Placement Manager in item 320 uses the capabilities of various server clusters and the profile of the workload to identify the target pool for each workload. The Local Placement Managers in the clusters 322, 326 use the existing workloads on various servers as well as the resource profile of the workload being placed to identify an optimal target server.

The overall flow of an exemplary method herein uses the following steps. When a placement request is submitted, the Global Placement Manager uses the monitored data for the workload and the capabilities of various server pools to select a target server pool. It then instructs an Automation Manager to create an image backup of the workload in the Image Library using the Image Manager. Finally, it instructs the Local Placement Manager to place the workload in its managed cluster. The Local Placement Manager identifies an appropriate target server in the pool and instructs the Automation Agent to place the workload along with its resource requirements. The Automation Agent uses the Virtualization Manager to create one or more virtual machines on the target server and assign resources to meet its performance goals. Once the virtual machine is created, the Automation Agent restores the backed up image from the Image Library on the target virtual machine. Once the virtual machine is restored, the user is notified that the virtual machine is available for use.

B. Method Insights

This disclosure now enumerates the insights from the workload characterization study and design based on these insights. The embodiments herein use server pools with reconfiguration ability for highly variable workloads, respect zoning restrictions by selecting server pools, place each workload independently to create a naturally online method, place a workload on servers with complementary workload, and optimize between current and future benefits using expected future workloads.

C. Methodology Flow

Figure 9:
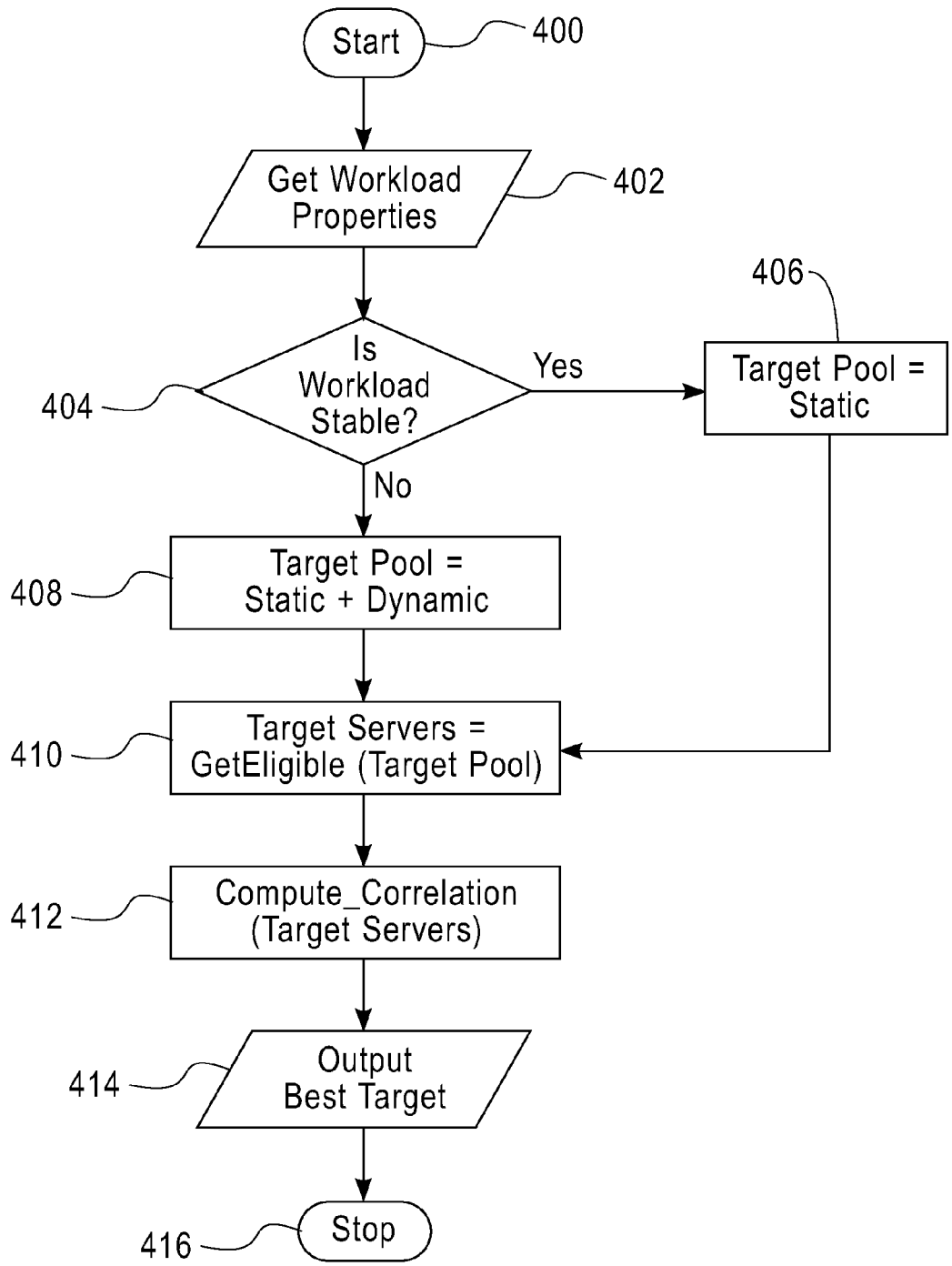
FIG. 9 is a flow diagram illustrating provisioning flow according to embodiments herein.

A provisioning flow is shown in flowchart form in FIG. 9. After starting in item 400, the workload properties 402 are taken as input from the user. This disclosure first identifies if the workload is highly variable 404. If the workload is highly variable 404, it may require dynamic resource reconfiguration for efficiency. Applications with stable workloads can be served from Static Pools 406. If not, the next step in the flow is to identify servers in the targeted pool types (static and dynamic) 408, which can host the application. The server should have spare capacity to host the application, and should meet all regulatory or business constraints 410. Once the target servers are identified in item 410, this method computes the correlation of new workload with the workloads on each candidate target server 412. The correlations are used to compute the marginal resource requirement on the target servers, and the server with the most efficient resource allocation (or least marginal resource requirement) is selected as the candidate for placement and the best target is output 414. The process is completed in item 416.

IV. Methodology Details

This disclosure now describes this methodology in greater detail.

A. Characterizing Workload Stability 404

For each workload, the embodiments herein monitor the load generated by it, and compute the corresponding mean and standard deviation. Workloads associated with a high degree of CoV are identified as unstable and deemed to require dynamic consolidation. As recited earlier, an application and its components have similar behavior with respect to their variance. Hence, an insight into the nature of the application reveals the stability information for all its workloads. This information is vitally used to intelligently place the workloads in a private cloud environment hosting a heterogeneous resource pool.

B. Identifying Feasible Resource Pools 408

The reuse of existing and the legacy servers with different capabilities is quite common in a private cloud. This heterogeneous environment poses a challenge for placing applications with various requirements and variability in workloads. Based on the dynamic re-consolidation capabilities of the existing servers in a data center, the servers are clustered into distinct pools, namely 'Static' or 'Dedicated', 'Dynamic' or 'Shared' and 'Live Migration'. Each workload is then mapped to the appropriate server pool based on the variance of the workload and that supported by the server pool. This decision of mapping is taken at a global level without any regard to the nature of existing workloads on the servers within the pools.

For instance, a static workload is routed to the 'Static' server pool which does not support dynamic consolidation, and visa-vis for variable workloads. The various zoning restrictions of the data center architecture are also met during this phase of selecting the feasible pool for a workload. The process of identifying the feasible resource pool is taken at a global level, and then within the pool this disclosure locally decides on the best target server for the workload based on the correlation factors discussed next.

C. Computing Correlation

The placement of a new workload should also take into account its correlation with the existing workloads on the server's pool. A good correlation metric will help in placing the new workload with complimentary workloads leading to lower resource wastage as well as lower probability of performance violation in the servers thereby reducing cost. However, for the 'Dedicated' server pool, as the resources are not shared, the workloads are sized on the servers simply based on their peak values, or if a certain violation threshold is permissible then assignment can be done based on the 90 or other percentile usage. The selection of the appropriate threshold is a trade-off between the server utilization and permissible violations.

This disclosure now discusses the various metrics that help to identify servers with complimentary workload in the 'Dynamic' pool. The new workload and the existing workloads on a server are considered to be complimentary, if they do not peak simultaneously at any time period when the workloads are sampled, i.e., there are no overlapping peaking among them. This scenario provides the best placement match for the new workload, which is negatively correlated with the existing workloads, catering to the maximum increase in resource utilization. This disclosure uses the idea of creating a resource envelope, first proposed in Verma 2009, to easily identify complementary workloads. The envelope of a workload profile identifies a body value (CB) to capture the typical resource usage (e.g., 90 or 80 percentile) and a peak value (CP) to capture peak usage (e.g., max usage). The envelope is a 2-level timeseries, where all resource usage below CB is replaced by CB and all usage above CB is replaced by CP. Since a server in a cloud may host multiple workloads, this method refines the 2-level envelope to a k-level envelope with multiple peaks (e.g, peaks corresponding to 100, 98, 96, 94 and 92 etc percentile usage).

The correlation between a new workload and existing workloads has two different aspects. The first aspect captures the degree of overlap between the highest peaks of the new workload and existing workloads. The second aspect captures the degree of overlap between the non-highest peaks of the workloads. This method captures both these aspects using two metrics, namely Peak Ratio and Buffer Weight.

Peak Ratio (PR) captures the overlap between the tallest peak of the existing workloads on the server and the new workload. Consider a server with a tallest peak of Pold and the placement of the new workload leads to a new peak of Pnew. Let P be the increase in the tallest peak (Pnew−Pold). Also, assume that P2 is the peak of the new workload. Peak Ratio is defined as the ratio between the increase in the peak P and the peak of the new workload P2 (e.g., FIG. 10). When PR is 1, the peaks completely overlap and thus the server will be a bad placement candidate for the new workload. A lower value of PR indicates a weaker correlation and a better candidate server for the new workload.

Figure 10:
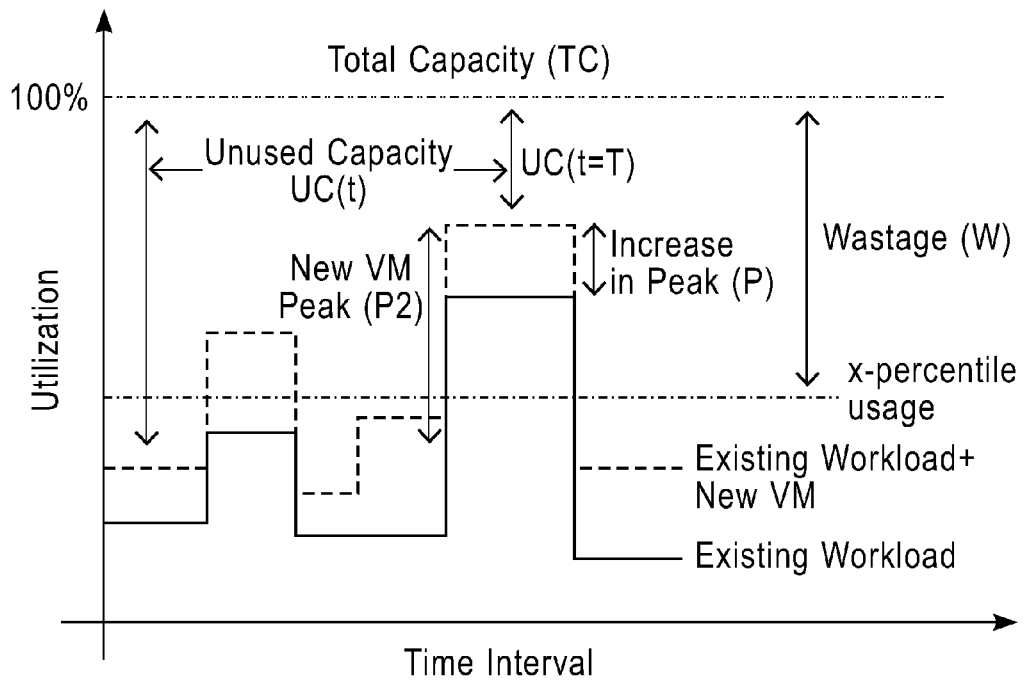
FIG. 10 illustrates local placement parameters according to embodiments herein.

Buffer Weight (BW) is computed as the overlap between all the peaks of existing workloads and the peaks of the new workload. The metric also gives different weightage to each of the peaks based on the likelihood that this disclosure will get a workload that is complementary to the peak. Formally, this disclosure uses a parameter UC (T) to capture the amount of un-utilized capacity of the server for the peak level. For any peak T, Buffer Weight is computed as the ratio between the increase in the peak P of the server and the unused capacity UC (T) for the peak (FIG. 10). The sum of the Buffer Weight of all the peaks is the Buffer Weight for each candidate server for the workload.

BW also captures the utilization of the server. Since one of the goals of cloud is to increase the resource utilization, the placement should try to increase the resource utilization. BW captures this aspect of cloud placement as it is dependent on unused capacity. Consider a server currently running at 5% utilization with a low resource workload. In such a case, even if there is an overlap of the peaks, the server will have enough free resources to host other future workloads with relatively uncorrelated peak characteristics, i.e., complimentary workloads. This is captured by a low BW value making the server a good candidate for placing the new workload. This provides an inherent weightage to all the peaks based on their demands and the amount of overlap.

D. Target Server Selection

This disclosure now presents the target selection methodology for 'Dynamic' server pools based on the correlation parameters identified earlier. The method (i) first attempts to find a complementary server. If no complementary server exists, (ii) it identifies if it can be placed on a new server and hopes to find complimentary workloads in future. If new servers cannot be started, (iii) it finds the best possible match from the candidate servers.

The goal of the target server selection methodology is to find servers with complementary workloads. Hence, this method first checks if there exists any server in the pool with uncorrelated workload with that of the new workload, i.e., there are no overlapping peaks between them. If such a server exists, then it forms the best candidate and the new workload is allocated to it. A second goal of cloud placement is to improve the server utilization. Hence, if there are multiple such uncorrelated servers found, this method calculates the actual wastage, W (FIG. 10) on each such target servers and select the one that will lead to minimal wastage. The wastage on a server is computed as the difference between its peak and the average utilization.

However, if there are no such complimentary servers for the new workload, this disclosure aims to optimize the tradeoff between placing the workload on a non-complimentary server (to improve resource utilization) and placing the workload on a new server (to improve the chances of finding compatible workloads later). This disclosure uses the insight that if new servers would be required to cater to future workloads, this method can place the workload on new servers (since server utilization would increase with future workloads). On the other hand, if there is a large unused capacity on existing servers, starting new servers would increase wastage. Hence, this method defines a parameter Global Unused Capacity (GUC=$\Sigma_{\forall S_i}$UC(T)) (FIG. 10) to capture the total free resource available on currently running servers. If the predicted future resource requirement is greater than the current GUC, this method starts a new server corresponding to the pool selected and adds it to the available server list of the pool.

With the list of candidate servers in the selected pool, this method computes the Peak Ratio (PR) for each of the servers considering the new workload to have been placed in them, and select the server, having a PR value of less than a threshold set based on the amount of permissible overlap of the peaks. If there are multiple such servers selected, this method then places the VM in the server with the minimum PR value. If no such server still exists, the embodiments herein calculate the Buffer Weight (BW) for each of the servers and allocate the new workload to the one having the least value. This strategy indicates that there does not exist any good candidate for the new workload, and it is thus placed such that the resource of the target server is not clogged and provides a possibility for it to find complimentary workloads in the future. However, before assigning a workload to any target server, this method checks if the requested resource capacity is available in the server. If not, this method selects the next best candidate. If no server in the mapped pool can handle the request, this method then places the new workload in the other server pools accordingly.

This intelligent placement strategy improves server utilization by matching complimentary workloads onto a single server, thereby reducing resource wastage, migrations and performance violations in the server pools.

Figure 11:
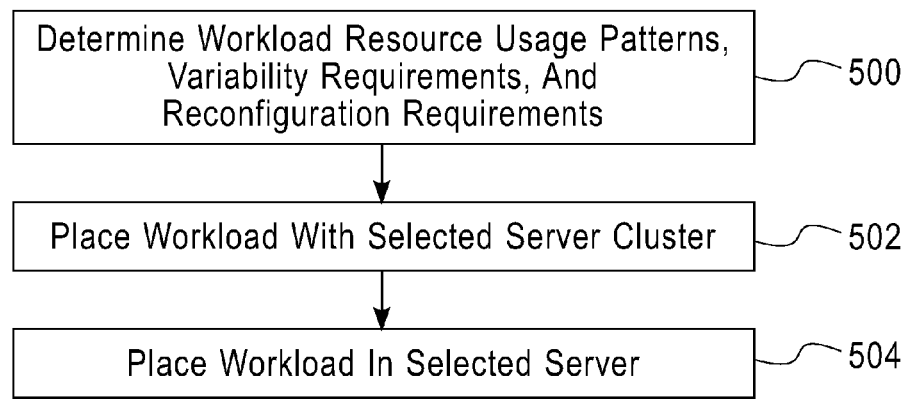
FIG. 11 is a flow diagram illustrating various embodiments herein.

FIG. 11 is a flowchart illustrating various exemplary method embodiments herein. In FIG. 11, processing begins in item 500, where the methods herein determine workload resource usage patterns, variability requirements, and reconfiguration requirements of a computerized workload, using a computerized device. Such methods herein place the computerized workload with a computer server cluster (within a private cloud computing environment) that matches the variability requirements and the reconfiguration requirements of the computerized workload, in item 502.

The private cloud computing environment comprises clusters of computer servers that have the ability to receive online placement of workloads and have heterogeneous reconfiguration capabilities. Also, within the private cloud computing environment, clusters of computer servers are controlled by at least one manager and are used by at least one user. The manager maintains resource usage patterns of workloads running on the clusters of computer servers and shares the resource usage patterns of such workloads with the users. Additionally, the users maintain resource usage patterns of the applications that are proposed to be uploaded to the clusters of computer servers, and shares such resource usage patterns with the manager.

Also, methods herein place the computerized workload on a selected computer server within the computer server cluster that has a resource usage pattern complementary to the workload resource usage profile, in item 504. The complementary resource usage pattern peaks at different times from the workload resource usage patterns. When the complementary resource usage pattern peaks at different times from the workload resource usage patterns, resources of the selected computer server are utilized at different times from other workloads running on the selected computer server. Additionally, methods herein distribute individual applications of software applications suites across different servers of the computer server cluster because such software applications have workloads that are non-complementary and peak at the same times. Alternately, the complementary resource usage pattern differs from the workload resource usage pattern in the resource (e.g., CPU, Memory, Network, Disk) that is contented for. When different resources are utilized at the same time as the workload resource usage pattern, the different resources of the selected computer server are utilized at the same time by all workloads running on the same selected computer server.

As will be appreciated by one skilled in the art, aspects of the embodiments herein may be a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments herein are described below with reference to flowchart illustrations and/or block diagrams of methods, apparatus (systems) and computer program products according to the embodiments. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 12:
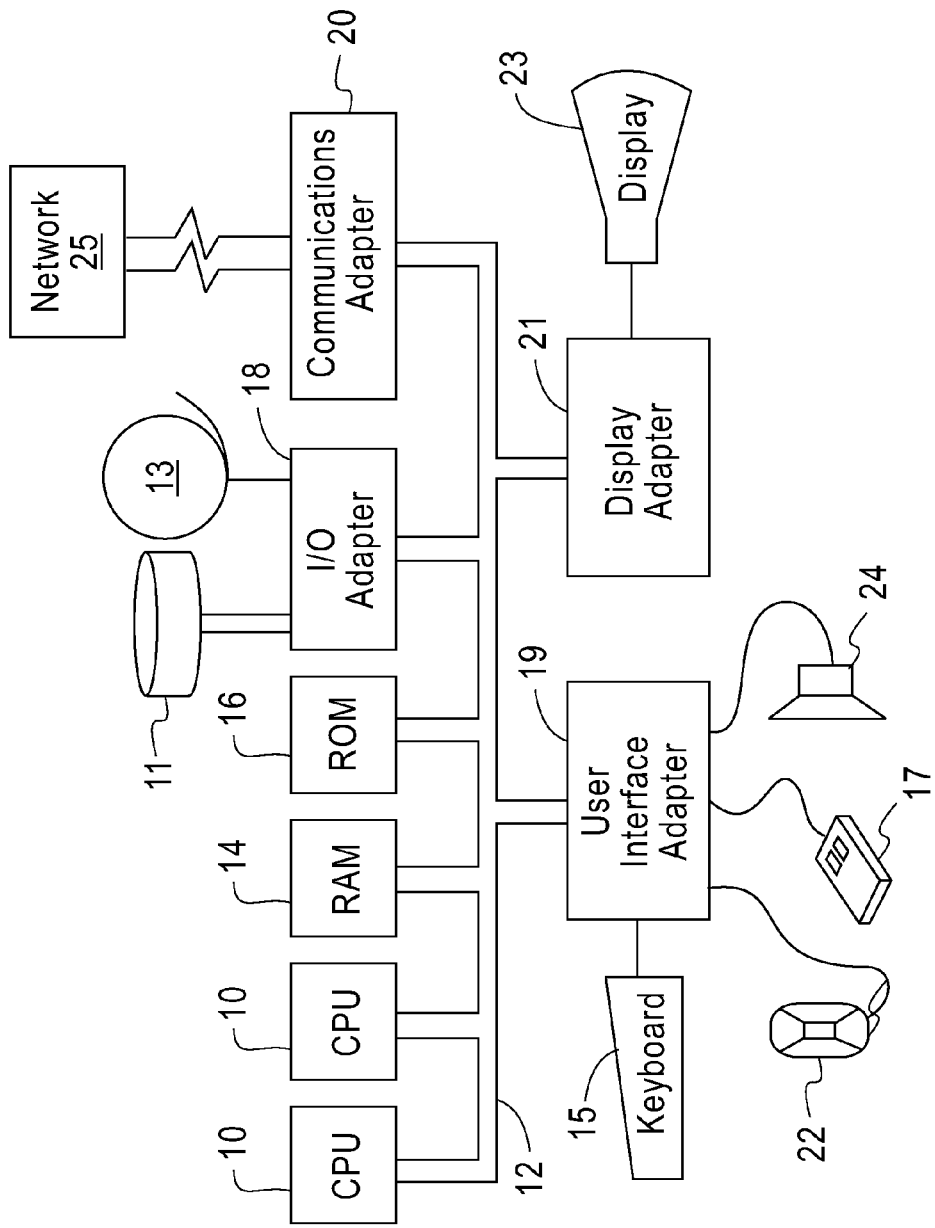
FIG. 12 is a schematic diagram of a hardware system according to embodiments herein.

A representative hardware environment for practicing the embodiments herein is depicted in FIG. 12. This schematic drawing illustrates a hardware configuration of an information handling/computer system in accordance with the embodiments. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 13:
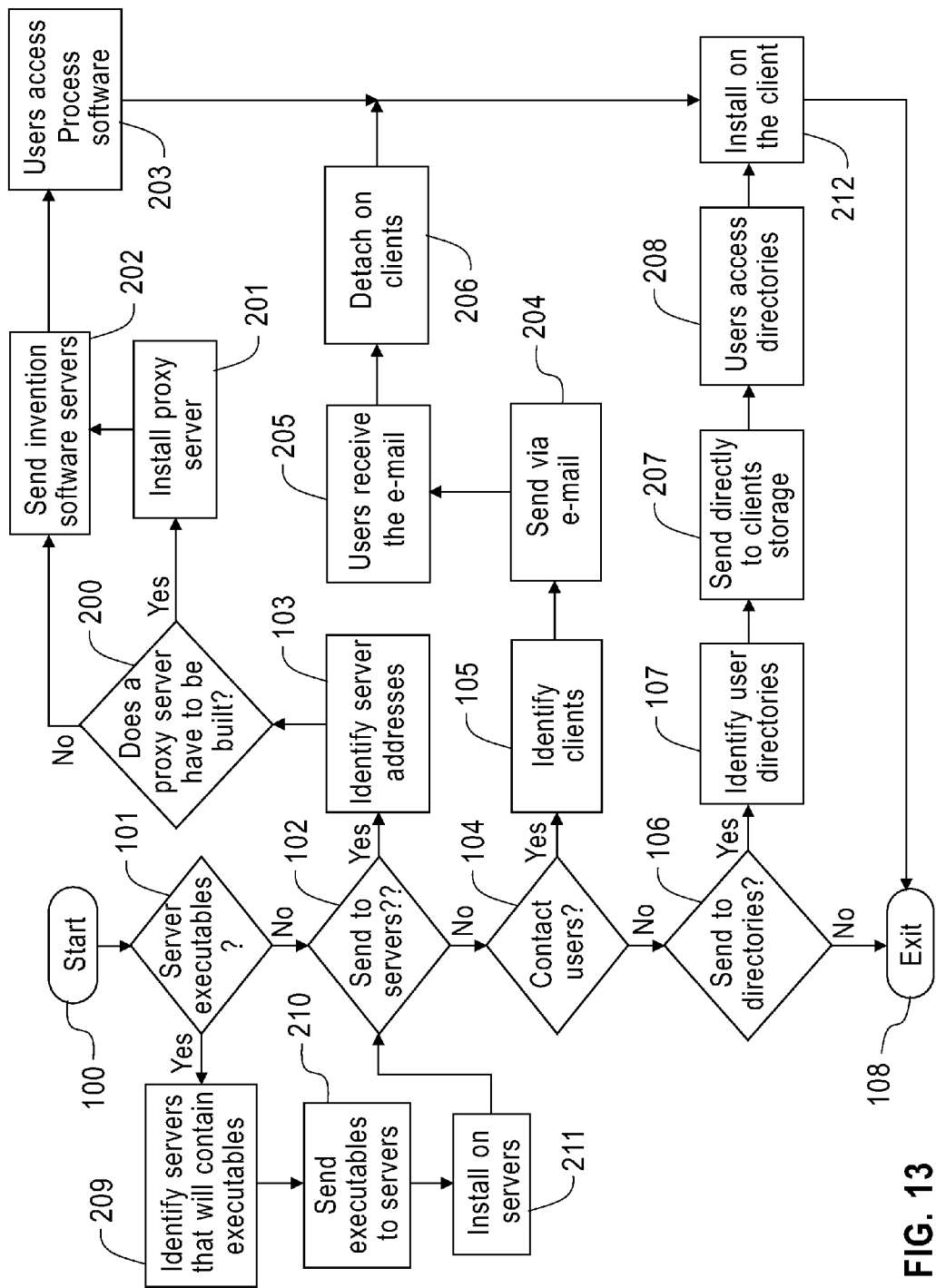
FIG. 13 is a schematic diagram of a deployment system according to embodiments herein.

In FIG. 13, step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211. Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

Figure 14:
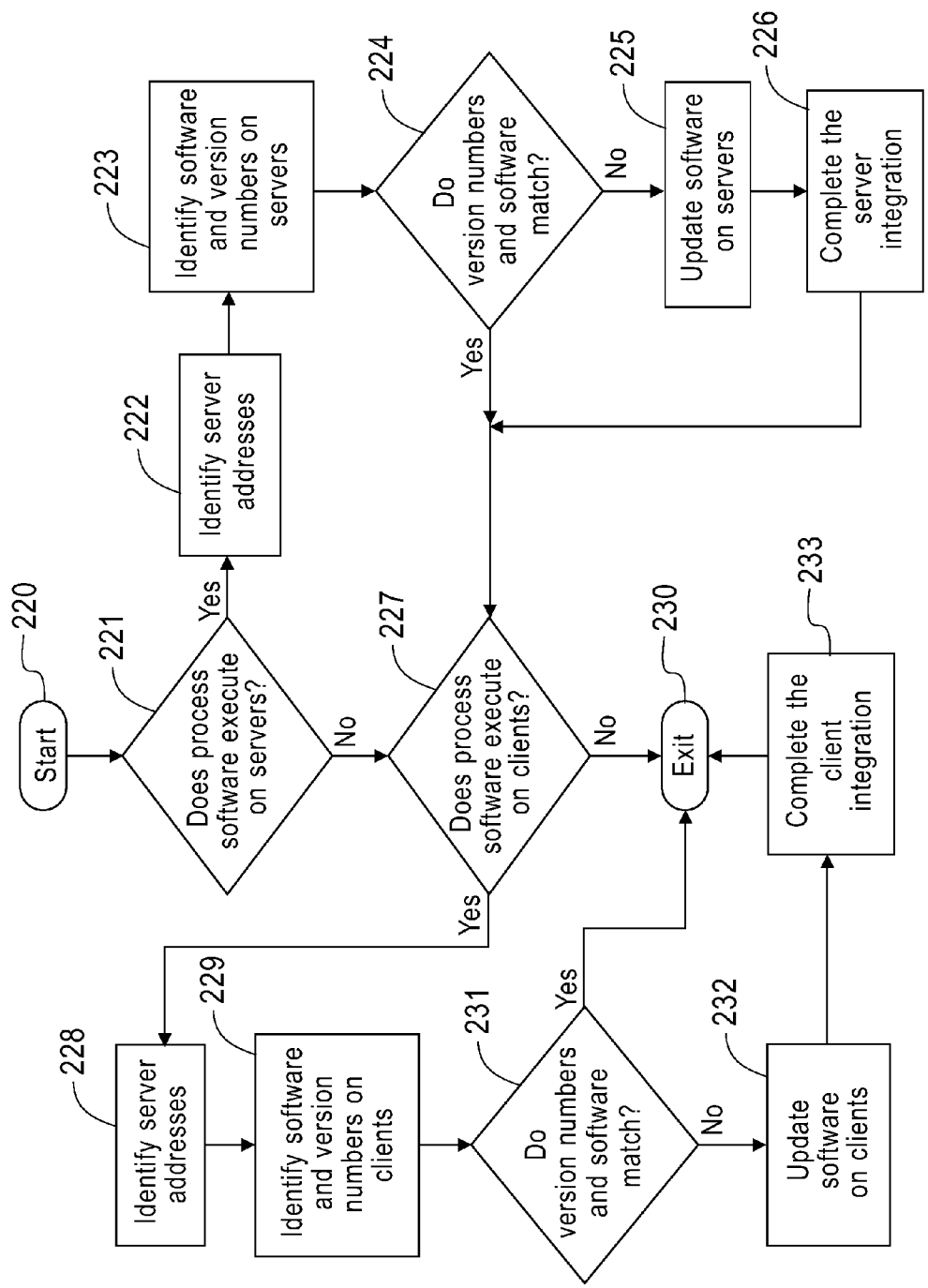
FIG. 14 is a schematic diagram of an integration system according to embodiments herein.

In FIG. 14, step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software, the integration continues in 227.

If one or more of the version numbers do not match, then the unmatched versions are updated on the server or servers with the correct versions 225. Additionally, if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this is not the case, then the client addresses are identified 228. The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits. If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

Figure 15:
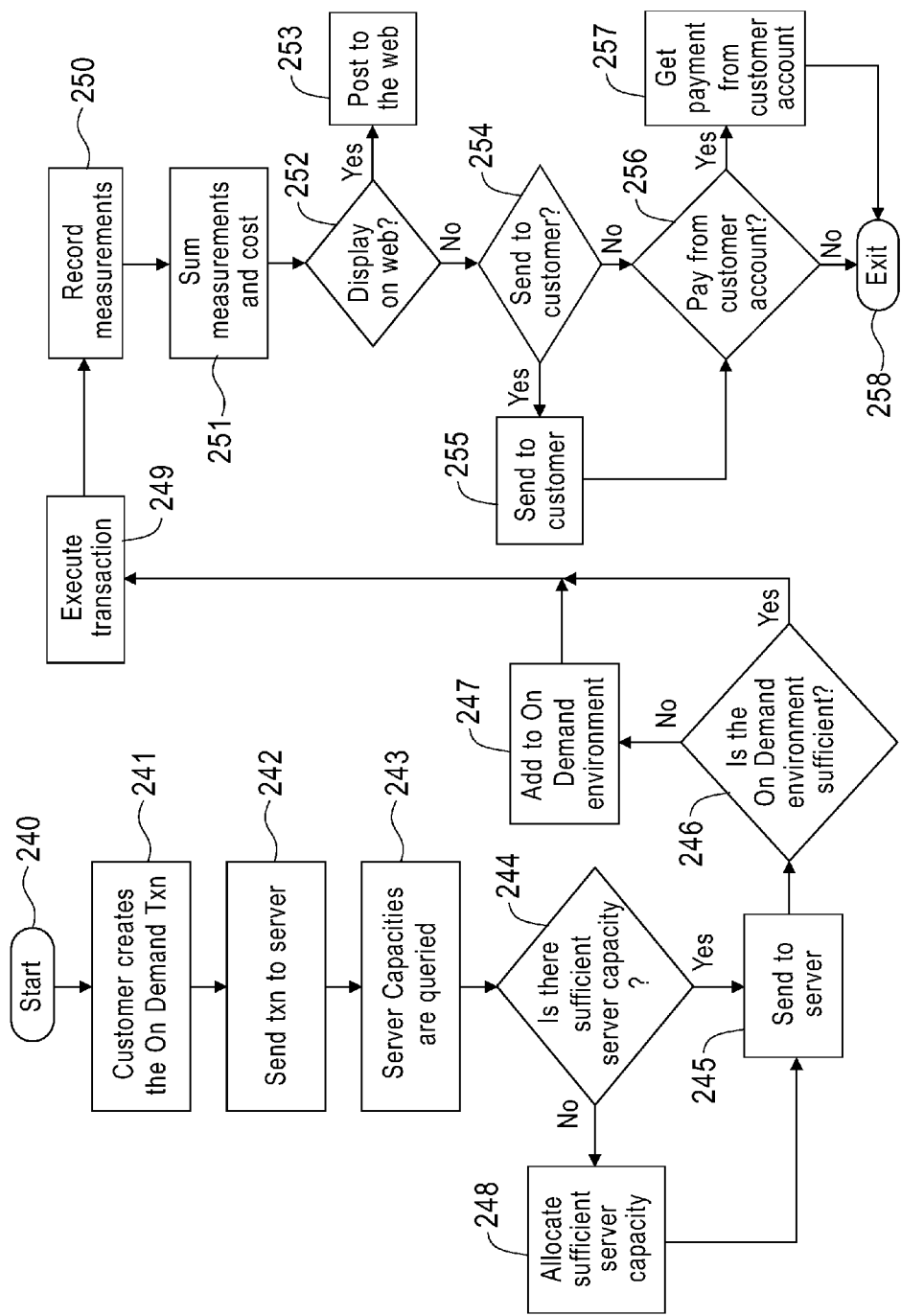
FIG. 15 is a schematic diagram of an on demand system according to embodiments herein.

In FIG. 15, step 240 begins the On Demand process. A transaction is created than contains the unique customer identification, the requested service type and any service parameters that further specify the type of service 241. The transaction is then sent to the main server 242. In an On Demand environment the main server can initially be the only server, then as capacity is consumed, other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions are, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs, the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 16:
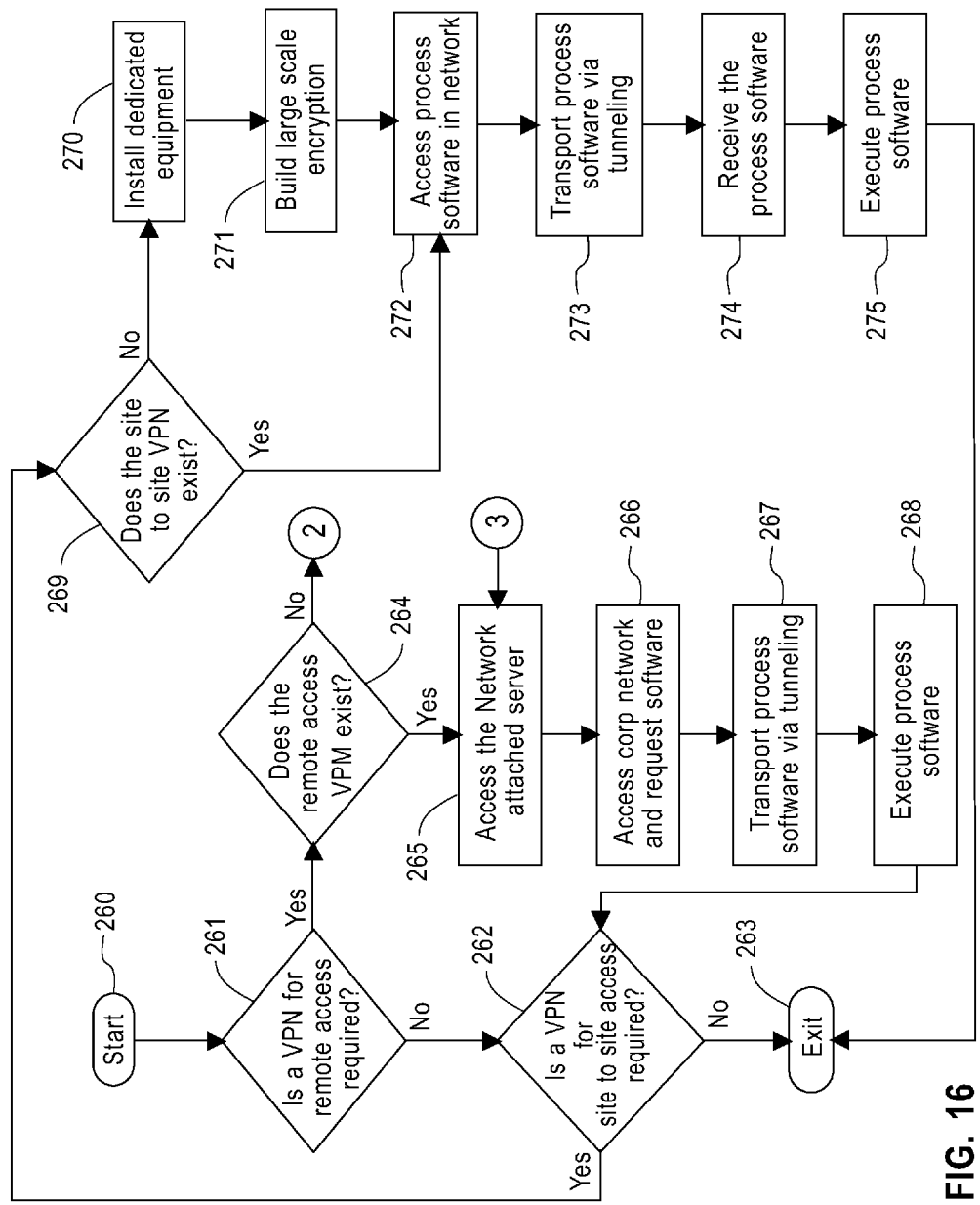
FIG. 16 is a schematic diagram of a virtual private network system according to embodiments herein.

In FIG. 16, step 260 begins the Virtual Private Network (VPN) process. A determination is made to see if a VPN for remote access is required 261. If it is not required, then proceed to 262. If it is required, then determine if the remote access VPN exists 264. If it does exist, then proceed to 265. After the remote access VPN has been built, or if it has been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is, the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then, build the large scale encryption into the VPN 271.

After the site to site VPN has been built or if it had been previously established, the users access the process software via the VPN 272. The process software is transported to the site users over the network via tunneling 273. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments herein have been presented for purposes of illustration and description, but is not intended to be exhaustive or limited to the embodiments in the form disclosed. Many modifications and variations will be apparent to those of ordinary skill in the art without departing from the scope and spirit of the embodiments herein. The embodiments herein were chosen and described in order to best explain the principles of the embodiments herein and the practical application, and to enable others of ordinary skill in the art to understand the various embodiments with various modifications, as are suited to the particular use contemplated.

What is claimed is:

1. A system comprising:
    a computerized device determining workload resource usage patterns, variability requirements, and reconfiguration requirements of a computerized workload;
    a global placement manager operatively connected to said computerized device, said global placement manager placing said computerized workload with a computer server cluster based on said variability requirements and said reconfiguration requirements of said computerized workload, said variability requirements comprising a measure of variation of workload intensity relative to average workload intensity of said computerized workload, and said reconfiguration requirements comprising a measure of dynamic resource utilization relative to static resource utilization of said computerized workload; and
    a local placement manager operatively connected to said computerized device, said local placement manager placing said computerized workload on a selected computer server within said computer server cluster that has a complementary resource usage pattern to said workload resource usage patterns, using said computerized device,
    said complementary resource usage pattern peaking at different times from said workload resource usage patterns.

2. The system according to claim 1, said placing of said computerized workload further comprising distributing software applications of software applications suites across different servers of said computer server cluster, said software applications of software applications suites having workloads that are non-complementary and peak at the same time.

3. The system according to claim 1, said complementary resource usage pattern peaking at different times from said workload resource usage patterns comprising utilizing resources of said selected computer server at different times from other workloads running on said selected computer server.

4. The system according to claim 1, said global placement manager being operatively connected to a private cloud computing environment comprising clusters of computer servers that have the ability to receive online placement of workloads and have heterogeneous reconfiguration capabilities.

5. The system according to claim 1, said global placement manager being operatively connected to a private cloud computing environment comprising clusters of computer servers that are controlled by at least one manager and that are used by at least one user, where:
    said manager maintains resource usage patterns of workloads running on said clusters of computer servers and shares said resource usage patterns of workloads running on said clusters of computer servers with said at least one user; and
    said at least one user maintains resource usage patterns of applications that are proposed to be uploaded to said clusters of computer servers and shares said resource usage patterns of applications that are proposed to be uploaded with said manager.

6. A computer storage medium device embodying a program of instructions executable by a computerized device, said program of instructions causing said computerized device to perform a method comprising:
    determining workload resource usage patterns of a computerized workload, using a computerized device;
    placing said computerized workload with a computer server cluster within a private cloud computing environment based on variability requirements and reconfiguration requirements of said computerized workload, said variability requirements comprising a measure of variation of workload intensity relative to average workload intensity of said computerized workload, and said reconfiguration requirements comprising a measure of dynamic resource utilization relative to static resource utilization of said computerized workload, using said computerized device; and placing said computerized workload on a selected computer server within said computer server cluster that has a complementary resource usage pattern to said workload resource usage patterns, using said computerized device, said complementary resource usage pattern peaking at different times from said workload resource usage patterns.

7. The computer storage medium device according to claim 6, said placing of said computerized workload further comprising distributing software applications of software applications suites across different servers of said computer server cluster, said software applications of software applications suites having workloads that are non-complementary and peak at the same time.

8. The computer storage medium device according to claim 6, said complementary resource usage pattern peaking at different times from said workload resource usage patterns comprising utilizing resources of said selected computer server at different times from other workloads running on said selected computer server.

9. The computer storage medium device according to claim 6, said private cloud computing environment comprising clusters of computer servers that have the ability to receive online placement of workloads and have heterogeneous reconfiguration capabilities.

10. The computer storage medium device according to claim 6, said private cloud computing environment comprising clusters of computer servers that are controlled by at least one manager and that are used by at least one user, where:

said manager maintains resource usage patterns of workloads running on said clusters of computer servers and shares said resource usage patterns of workloads running on said clusters of computer servers with said at least one user; and said at least one user maintains resource usage patterns of applications that are proposed to be uploaded to said clusters of computer servers and shares said resource usage patterns of applications that are proposed to be uploaded with said manager.

11. A non-transitory computer storage medium readable by a computer embodying a program of instructions executable by said computer for performing a method for outputting interpersonal relationship influence information between a pair of participants in an interaction channel, said method comprising:

determining workload resource usage patterns of a computerized workload, using a computerized device;

determining variability requirements of said computerized workload, using a computerized device;

determining reconfiguration requirements of said computerized workload, using a computerized device;

placing said computerized workload with a computer server cluster within a private cloud computing environment based on said variability requirements and said reconfiguration requirements of said computerized workload, using said computerized device: said variability requirements comprising a measure of variation of workload intensity relative to average workload intensity of said computerized workload, and said reconfiguration requirements comprising a measure of dynamic resource utilization relative to static resource utilization of said computerized workload; and placing said computerized workload on a selected computer server within said computer server cluster that has a complementary resource usage pattern to said workload resource usage patterns, using said computerized device, said complementary resource usage pattern peaking at different times from said workload resource usage patterns.

12. The non-transitory computer storage medium according to claim 11, said placing of said computerized workload further comprising distributing software applications of software applications suites across different servers of said computer server cluster, said software applications of software applications suites having workloads that are non-complementary and peak at the same time.

13. The non-transitory computer storage medium according to claim 11, said complementary resource usage pattern peaking at different times from said workload resource usage patterns comprising utilizing resources of said selected computer server at different times from other workloads running on said selected computer server.

14. The non-transitory computer storage medium according to claim 11, said private cloud computing environment comprising clusters of computer servers that have the ability to receive online placement of workloads and have heterogeneous reconfiguration capabilities.

15. The non-transitory computer storage medium according to claim 11, said private cloud computing environment comprising clusters of computer servers that are controlled by at least one manager and that are used by at least one user, where:

said manager maintains resource usage patterns of workloads running on said clusters of computer servers and shares said resource usage patterns of workloads running on said clusters of computer servers with said at least one user; and said at least one user maintains users maintain resource usage patterns of applications that are proposed to be uploaded to said clusters of computer servers and shares said resource usage patterns of applications that are proposed to be uploaded with said manager.

* * * * *